United States Patent [19]

Anthony

[11] Patent Number: 4,487,230
[45] Date of Patent: Dec. 11, 1984

[54] INCREASING THE OUTPUT OF A PIPELINE ANODE

[75] Inventor: Donald R. Anthony, Plano, Tex.

[73] Assignee: Atlantic Richfield Company, Los Angeles, Calif.

[21] Appl. No.: 329,498

[22] Filed: Dec. 10, 1981

[51] Int. Cl.³ .............................................. F16L 58/00
[52] U.S. Cl. .................................... 138/103; 138/105; 138/149; 138/178; 138/DIG. 6; 204/148; 204/197
[58] Field of Search .............. 138/103, 105, 106, 149, 138/178, DIG. 6; 204/148, 197; 307/95

[56] References Cited

U.S. PATENT DOCUMENTS

| 3,254,012 | 5/1966 | Ziegler | 204/197 X |
| 3,354,063 | 11/1967 | Shutt | 204/197 X |
| 3,410,313 | 11/1968 | Martin | 138/103 |
| 3,553,094 | 1/1971 | Scott et al. | 204/148 X |
| 3,990,478 | 11/1976 | McFarland | 138/103 |
| 4,040,447 | 8/1977 | Scott | 138/103 X |
| 4,370,211 | 1/1983 | Hykler | 204/148 |

Primary Examiner—James E. Bryant, III
Attorney, Agent, or Firm—M. David Folzenlogen

[57] ABSTRACT

In the cathodic protection of tubular goods transporting fluids above 100° F. with aluminum or zinc anodes, the output efficiency of the anode is increased by thermally insulating the anode from the tubular goods on which the anode is placed.

6 Claims, 1 Drawing Figure

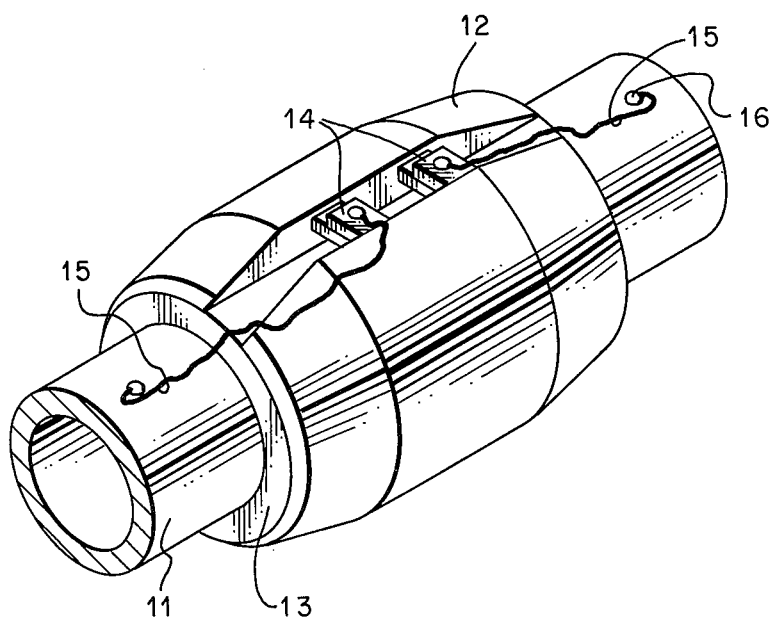

INCREASING THE OUTPUT OF A PIPELINE ANODE

BACKGROUND OF THE INVENTION

This invention relates to cathodic protection of tubular goods transporting hot fluids. More particularly, the output efficiency of a sacrificial aluminum or zinc anode is increased by thermally insulating the anode from the pipe on which it is placed.

The use of sacrificial anodes made of aluminum, zinc, or their alloys on the outer surface of tubular members is well known. In many cases, the anode is placed on or around a tubular pipeline member that is either buried in the earth and that is used to conduct hot fluids, that is, fluids with a temperature above 100° F. Heat inside the tubular member is transferred to the anode and the anode output efficiency decreases. For example, at 180° F., the useful output drops to about 50%.

SUMMARY OF THE INVENTION

The output efficiency of an aluminum or zinc sacrificial anode is increased by thermally insulating the anode from the tubular member which it is used to protect. More particularly, there is provided an anode system for cathodically protecting the exterior surface of tubular members carrying fluids above 100° F. The tubular member and anode are located in the earth. The anode system is comprised of an anode located near the tubular member and a thermal insulating material located between the anode and the tubular member. The sacrificial part of the anode is made of a metal selected from the group consisting of aluminum, zinc, alloys of aluminum, alloys of zinc, or mixtures thereof. In operation, the insulating material protects the anode from the heat of the fluid inside the tubular member and causes the temperature of the anode to be closer to the temperature of the earthen environment in which the tubular member is located.

BRIEF DESCRIPTION OF THE DRAWINGS

The drawing shows a bracelet-type sacrificial anode and insulating material placed around a tubular member.

DETAILED DESCRIPTION OF THE PREFERRED EMBODIMENTS

This disclosure applies to a cathodic protection anode system for the exterior surface of a tubular member made of iron, that is, a tubular member made of steel, iron alloys, iron and the like. The tubular member will be located in an earthen environment and will transport fluids above 100° F. Accordingly, in the drawing, tubular pipe member 11 through which hot fluids will be flowed is encompassed by bracelet anode 12. The sacrificial metal part of the anode is selected from the group consisting of aluminum, zinc, alloys of aluminum, alloys of zinc, or mixtures thereof. Between anode 12 and the exterior surface of tubular member 11 is thermal insulating material 13. The thermal insulating material may be any sort of durable substance suitable for the purposes and uses herein described. For example, the insulating material may be made up of foamed materials, glass padding, polyurethane, polystyrene or any other suitable durable insulating material at least one-eighth inch thick, with a thickness of about one inch being preferred.

As shown, the anode is a tapered bracelet anode which is adapted to be placed near the outer surface of tubular member 11 by locating the anode around the tubular member and interconnecting overlapping strapping members 14. For purposes of this disclosure, the anode must be electrically connected to the tubular member, but must not be in metal-to-metal contact with the tubular member. Consequently, overlapping members 14 are made of a suitable metal, for example, steel, which is in metal-to-metal contact with the sacrificial metal part of the anode and overlapping members 14 are connected by electrically conductive wire 15 to tubular member 11 at electrically conductive glue, weld or solder spots 16 on tubular member 11.

Thermal insulating material 13 must at least separate the sacrificial metal part of the anode from the outer surface of the pipe. The insulating material could also be extended to cover the entire periphery of the tubular member under all parts of the anode and could extend beyond the anode edges. The thermal insulating material could be affixed to the inner surface of the sacrificial part of anode before the anode is placed near, on or around the tubular member. The amount, type and location of the thermal insulating material is sufficient to cause the anode to remain or stay closer to the temperature of the earthen environment than to the temperature of the hot fluids transported through the tubular member.

In practice, the anode system is installed by placing thermal insulating material on the outer surface of tubular member 11 at an appropriate point to shield anode 12 from direct metal-to-metal contact with the tubular member. At the same time or thereafter, the anode is placed adjacent the thermal insulating material in a manner such that the sacrificial metal part of the anode does not have metal-to-metal contact with tubular member 12. The anode is then electrically connected to the tubular member so that ions may flow into the environment while electrons flow through the metal electrically conductive path of the galvanic cell created by the overall arrangement.

Reasonable variations and modifications are practical within the scope of this disclosure without departing from the spirit and scope of the claimed invention.

The embodiments of the invention in which an exclusive property or privilege is claimed are defined as follows:

1. In combination with an iron tubular member located in an earthen environment and through which fluids above 100° F. are to be transported a cathodic protection anode system consisting essentially of: a sacrificial anode selected from the group consisting of aluminum, zinc, or alloys of aluminum, alloys of zinc, or mixtures thereof, said anode being adapted to cause ions to flow into said environment and adapted to be placed near and encircle a substantial portion of the outer surface of said tubular member; a thermal insulating material located between the outer surface of said tubular member and said anode to insulate said anode so that the temperature of said anode stays closer to the temperature of said environment than to the temperature of the fluids transported through said tubular member; and means electrically connecting said anode to said tubular member.

2. The cathodic protection anode system of claim 1 wherein the thermal insulating material is comprised of polyurethane at least one-eighth inch thick.

3. The cathodic protection anode system of claim 1 wherein the thermal insulating material is comprised of polystyrene at least one-eighth inch thick.

4. The cathodic protection anode system of claim 1 wherein the anode is adapted to be placed near and encircle the entire circumference of the tubular member.

5. The cathodic protection anode system of claim 4 wherein the thermal insulating material is comprised of polyurethane at least one-eighth inch thick.

6. The cathodic protection anode system of claim 4 wherein the thermal insulating material is comprised of polystyrene at least one-eighth inch thick.

* * * * *